(12) United States Patent
Lim et al.

(10) Patent No.: US 9,921,458 B2
(45) Date of Patent: Mar. 20, 2018

(54) CAMERA MODULE

(71) Applicant: SAMSUNG ELECTRO-MECHANICS CO., LTD., Suwon-si (KR)

(72) Inventors: Soo Cheol Lim, Suwon-si (KR); Chul Jin Kim, Suwon-si (KR); Oh Byoung Kwon, Suwon-si (KR); Sung Ryung Park, Suwon-si (KR); Jae Hyuk Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/724,143

(22) Filed: May 28, 2015

(65) Prior Publication Data

US 2015/0346587 A1    Dec. 3, 2015

(30) Foreign Application Priority Data

May 30, 2014    (KR) ..................... 10-2014-0066563
Aug. 8, 2014    (KR) ..................... 10-2014-0102588

(Continued)

(51) Int. Cl.
   *G03B 17/02*      (2006.01)
   *G03B 5/02*       (2006.01)
   (Continued)

(52) U.S. Cl.
   CPC .............. *G03B 17/02* (2013.01); *G03B 3/10* (2013.01); *G03B 5/02* (2013.01); *H04N 5/2254* (2013.01);
   (Continued)

(58) Field of Classification Search
CPC .... G03B 17/02; H04N 5/2257; H04N 5/2254; H04N 5/2252
See application file for complete search history.

(56) References Cited

U.S. PATENT DOCUMENTS 5,499,143 A     3/1996    Sakamoto et al.
8,861,946 B2*    10/2014    Kim ..................... G02B 27/646
                                                   396/55

(Continued)

FOREIGN PATENT DOCUMENTS

CN         1869763 A     11/2006
CN       101377603 A      3/2009

(Continued)

OTHER PUBLICATIONS

Korean Office Action dated Sep. 10, 2015 in counterpart Korean Patent Application No. 10-2014-0164618 (9 pages in English, 7 pages in Korean).

(Continued)

*Primary Examiner* — Ahmed A Berhan
(74) *Attorney, Agent, or Firm* — NSIP Law

(57) ABSTRACT

There is provided a camera module including: a housing unit; a lens unit which is movable relative to the housing unit in an optical axis direction and directions perpendicular with respect to an optical axis; and an actuator unit moving the lens unit, wherein corners of the housing unit are provided with flat surfaces which are inclined with respect to an optical axis of the lens unit.

5 Claims, 10 Drawing Sheets

(30) Foreign Application Priority Data

Oct. 31, 2014 (KR) ........................ 10-2014-0150614
May 22, 2015 (KR) ........................ 10-2015-0072066

(51) Int. Cl.
*G03B 3/10* (2006.01)
*H04N 5/225* (2006.01)

(52) U.S. Cl.
CPC ... *H04N 5/2257* (2013.01); *G03B 2205/0007* (2013.01); *H04N 5/2252* (2013.01)

(56) References Cited

U.S. PATENT DOCUMENTS

| | | | |
|---|---|---|---|
| 2006/0269262 A1* | 11/2006 | Shin | G02B 27/646 396/55 |
| 2009/0060485 A1 | 3/2009 | Takahashi | |
| 2009/0303594 A1 | 12/2009 | Lim et al. | |
| 2010/0183288 A1 | 7/2010 | Kudoh | |
| 2011/0026915 A1 | 2/2011 | Baik et al. | |
| 2012/0082442 A1 | 4/2012 | Kwon et al. | |
| 2012/0154614 A1† | 6/2012 | Moriya | |
| 2012/0320467 A1† | 12/2012 | Baik | |
| 2013/0010378 A1* | 1/2013 | Wang | H02K 41/0356 359/824 |
| 2013/0039640 A1 | 2/2013 | Sekimoto | |
| 2013/0163085 A1 | 6/2013 | Lim et al. | |
| 2014/0043496 A1 | 2/2014 | Azuma | |
| 2015/0049209 A1† | 2/2015 | Hwang | |
| 2015/0201127 A1 | 7/2015 | Ahn | |

FOREIGN PATENT DOCUMENTS

| | | |
|---|---|---|
| CN | 100510844 C | 7/2009 |
| CN | 201637916 U | 11/2010 |
| CN | 102445811 A | 5/2012 |
| CN | 103649827 A | 3/2014 |
| EP | 1727358 A2 | 11/2006 |
| EP | 2840770 A2 | 2/2015 |
| EP | 2852148 A2 | 3/2015 |
| JP | 2007-013661 A | 1/2007 |
| JP | 2008-304850 A | 12/2008 |
| JP | 2010-164926 A | 7/2010 |
| JP | 2014-77886 A | 5/2014 |
| KR | 10-2009-0127628 A | 12/2009 |
| KR | 10-2010-0048246 A | 5/2010 |
| KR | 10-2010-0109727 A | 10/2010 |
| KR | 10-2011-0024433 A | 3/2011 |
| KR | 10-2011-0106148 A | 9/2011 |
| KR | 10-2012-0092973 A | 8/2012 |
| KR | 10-2012-0123883 A | 11/2012 |
| KR | 10-2013-0071000 A | 6/2013 |
| KR | 10-1273793 B1 | 6/2013 |
| KR | 10-2013-0072721 A | 7/2013 |
| KR | 10-2013-0119703 A | 11/2013 |
| KR | 10-2014-0001640 A | 1/2014 |
| KR | 10-2014-0142189 A | 12/2014 |

OTHER PUBLICATIONS

Extended European Search Report dated Dec. 9, 2015, in counterpart European Application No. 15163338.5 (8 pages, in English).
U.S. Non-Final Office Action dated Jun. 1, 2016 in counterpart U.S. Appl. No. 14/658,527 (19 pages).
Chinese Office Action dated Mar. 6, 2017 in corresponding Chinese patent application No. 201510170097.5 (8 pages in English, 6 pages in Chinese).
Chinese Office Application dated Mar. 17, 2017 in corresponding Chinese Patent Application No. 201510171253.X (7 pages in English and 6 pages in Chinese).
U.S. Final Rejection dated Jun. 24, 2015 in counterpart U.S. Appl. No. 14/311,210 (7 pages).
Chinese Office Action dated Sep. 4, 2017, in corresponding Chinese Application No. 201510292471.9 (7 pages in English, 6 pages in Chinese).
Korean Office Action dated Nov. 28, 2017, in corresponding Korean Application No. 10-2016-0182147 (6 pages in English, 5 pages in Korean).
Korean Office Action dated Dec. 6, 2017, in corresponding Korean Application No. 10-2015-0072066 (6 pages in English, 5 pages in Korean).

\* cited by examiner
† cited by third party

"A"

"C"

D-D

CAMERA MODULE

CROSS-REFERENCE TO RELATED APPLICATIONS

This application claims the priorities and benefits of Korean Patent Application Nos. 10-2014-0066563 filed on May 30, 2014, 10-2014-0102588 filed on Aug. 8, 2014, 10-2014-0150614 filed on Oct. 31, 2014 and 10-2015-0072066 filed on May 22, 2015, with the Korean Intellectual Property Office, the disclosures of which are incorporated herein by reference.

BACKGROUND

The present disclosure relates to a camera module mounted in a portable terminal.

A camera module may have an autofocus function. In addition, such a camera module may have an optical image stabilization (OIS) function in order to decrease a degradation of resolution caused by hand-shake.

The camera module having the above-mentioned functions has a structure in which a lens unit may move relative to a housing of the camera module in an optical axis direction or a direction perpendicular with respect to an optical axis.

SUMMARY

An aspect of the present disclosure may provide a camera module having improved operational reliability.

According to an aspect of the present disclosure, a camera module may have a structure allowing for the camera module to be easily mounted, and operational reliability thereof may be improved.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
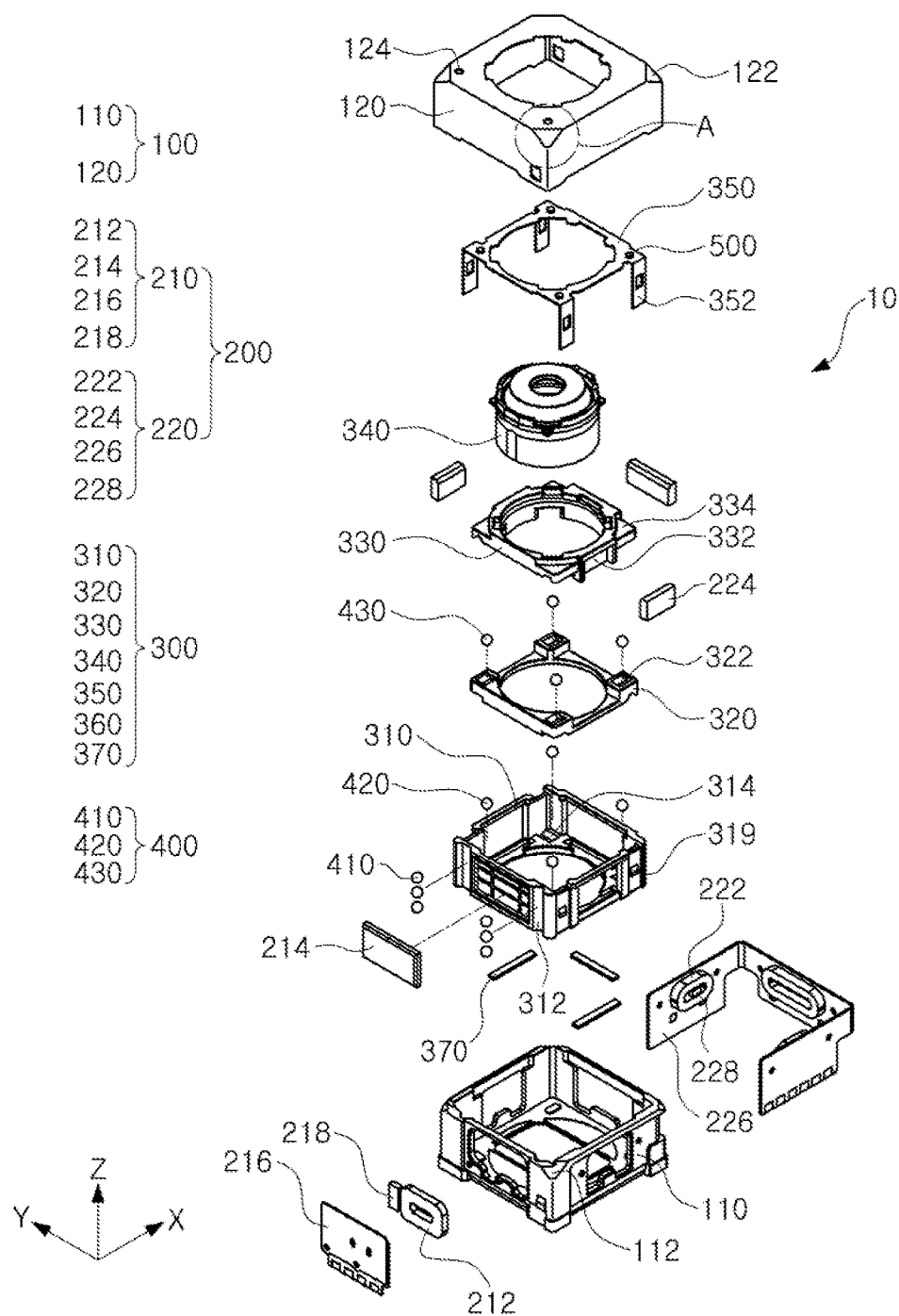
FIG. 1 is an exploded perspective view of a camera module according to an exemplary embodiment in the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

A camera module according to an exemplary embodiment in the present disclosure will be described with reference to FIG. 1.

A camera module 10 may include a housing unit 100, an actuator unit 200, and a lens unit 300. In addition, the camera module 10 may further include a buffer member 500.

The housing unit 100 may include a housing 110 and a shield can 120.

The housing 110 may be formed of an easily shaped material. For example, the housing 110 may be formed of plastic. One or more actuator units 200 may be mounted in the housing 110. For example, a first actuator 210 may be partially mounted on a first side surface of the housing 110, and a second actuator 220 may be partially mounted on second to fourth side surfaces of the housing 110. The housing 110 may accommodate the lens unit 300 therein. For example, an accommodation space in which the lens unit 300 may be completely or partially accommodated may be formed in the housing 110. The six surfaces of the housing 110 may be open. For example, a rectangular hole for an image sensor may be formed in a bottom surface of the housing 110, and a square hole for mounting the above-mentioned lens unit 300 may be formed in a top surface of the housing 110. In addition, a hole into which a first coil 212 of the first actuator 210 may be inserted may be formed in the first side surface of the housing 110, and holes into which second coils 222 of the second actuator 220 may be inserted may be formed in the second to fourth side surfaces of the housing 110.

The shield can 120 may cover a portion of the housing 110. For example, the shield can 120 may cover the top surface and the four side surfaces of the housing 110. However, the shape of the shield can 120 is not limited thereto. For example, the shield can 120 may only cover the four side surfaces of the housing 110. Alternatively, the shield can 120 may partially cover the top surface and the four side surfaces of the housing 110.

Corners 122 of the shield can 120 may be processed to be flattened. For example, four corners 122 of the top surface of the shield can 120 may be pressed to be substantially flat as illustrated in FIG. 1. This shape may allow the camera module 10 to be easily mounted. Meanwhile, upper corners 112 of the housing 110 may be processed to be flattened such that the shapes thereof are the same as or similar to those of the corners 122 of the shield can 120, whereby the housing 110 may be easily coupled to the shield can 120.

The actuator unit 200 may move the lens unit 300 in one or more directions. For example, the actuator unit 200 may move the lens unit 300 in an optical axis direction (a Z axis direction corresponding to a first direction) and directions (an X axis direction and a Y axis direction corresponding to second and third directions, respectively) perpendicular with respect to an optical axis.

The actuator unit 200 may be provided in plural. For example, the actuator unit 200 may include the first actuator 210 moving the lens unit 300 in the Z axis direction (based on FIG. 1) and the second actuator 220 moving the lens unit 300 in the X axis direction and the Y axis direction (based on FIG. 1).

The first actuator 210 may be mounted in the housing 110 and a first frame 310 of the lens unit 300. For example, portions of the first actuator 210 may be mounted on the first side surface of the housing 110, and the remaining portions of the first actuator 210 may be mounted on a first side surface of the first frame 310. The first actuator 210 may include an element for moving the lens unit 300 in the optical axis direction. For example, the first actuator 210 may include the first coil 212, a first permanent magnet 214, a first substrate 216, and a first sensor 218. The first coil 212 and the first sensor 218 may be formed on the first substrate 216. The first substrate 216 may be mounted on the first side surface of the housing 110, and the first permanent magnet 214 may be mounted on the first side surface of the first frame 310 facing the first substrate 216.

The first actuator 210 may change a magnitude and a direction of magnetic force generated between the first coil 212 and the first permanent magnet 214 to enable the first frame 310 and a lens barrel 340 to move relative to the housing 110. In addition, the first actuator 210 may sense a position of the first frame 310 through a change in magnetic flux sensed by the first sensor 218.

The second actuator 220 may be mounted in the housing 110 and a third frame 330 of the lens unit 300. For example, portions of the second actuator 220 may be mounted on the second to fourth side surfaces of the housing 110, and the remaining portions of the second actuator 220 may be mounted on second to fourth side surfaces of the third frame 330. The second actuator 220 may include an element for moving the lens unit 300 in the directions perpendicular with respect to the optical axis. For example, the second actuator 220 may include a plurality of second coils 222, a plurality of second permanent magnets 224, a second substrate 226, and one or more second sensors 228. The plurality of second coils 222 and the one or more second sensors 228 may be formed on the second substrate 226. The second substrate 226 may be formed to have a substantially "⊏" shape and may be mounted in a manner in which the second substrate 226 encloses the second to fourth side surfaces of the housing 110. The plurality of second permanent magnets 224 may be mounted on the second to fourth side surfaces of the third frame 330, respectively, to face the second substrate 226.

The second actuator 220 may change a magnitude and a direction of magnetic force generated between the plurality of second coils 222 and the plurality of second permanent magnets 224 to enable the second and third frames 320 and 330 to move relative to the first frame 310. For reference, the lens barrel 340 may move in the same directions as those of the second and third frames 320 and 330 by the movements of the second and third frames 320 and 330. The second actuator 220 may sense positions of the second and third frames 320 and 330 through a change in magnetic flux sensed by the second sensors 228.

The lens unit 300 may be mounted in the housing unit 100. For example, the lens unit 300 may be accommodated in the accommodation space formed by the housing 110 and the shield can 120 to move in at least three axial directions.

The lens unit 300 may include a plurality of frames. For example, the lens unit 300 may include the first frame 310, the second frame 320, and the third frame 330.

The first frame 310 may move relative to the housing 110. For example, the first frame 310 may move in a height direction (the Z axis direction based on FIG. 1) of the housing 110 by the above-mentioned first actuator 210. A plurality of guide grooves 312 and 314 may be formed in the first frame 310. For example, a first guide groove 312 extended in the optical axis direction (the Z axis direction base on FIG. 1) may be formed in the first side surface of the first frame 310, and second guide grooves 314 extended in the first direction (the Y axis direction based on FIG. 1) perpendicular with respect to the optical axis may be formed in four corners of an inner bottom surface of the first frame 310, respectively. At least three side surfaces of the first frame 310 may be open. For example, second to fourth side surfaces of the first frame 310 may be open so that the second permanent magnet 224 of the third frame 330 and the second coil 222 of the housing 110 may face each other.

Mounting parts 317 in which magnetic bodies 370 are mounted may be formed in the first frame 310. For example, the mounting parts 317 in which a plurality of magnetic bodies 370 may be mounted may be formed in the bottom surface of the first frame 310. An adhesive for fixing the magnetic bodies 370 may be applied to the mounting parts 317. The surface of the mounting part 317 may be processed to have a predetermined degree of roughness. For example, the mounting part 317 may be roughly polished or etched. The mounting part 317 processed or chemically treated as described above may increase fixation force of the magnetic body 370 through the adhesive by increasing an area to which the adhesive is to be applied.

The second frame 320 may be mounted in the first frame 310. For example, the second frame 320 may be mounted in an internal space of the first frame 310. The second frame 320 may move relative to the first frame 310 in the first direction perpendicular with respect to the optical axis. For example, the second frame 320 may move in the first direction (the Y axis direction based on FIG. 1) perpendicular with respect to the optical axis along the second guide grooves 314 of the first frame 310. A plurality of guide grooves 322 may be formed in the second frame 320. For example, four third guide grooves 322 extended in the second direction (the X axis direction based on FIG. 1) perpendicular with respect to the optical axis may be formed in corners of the second frame 320.

Figure 11:
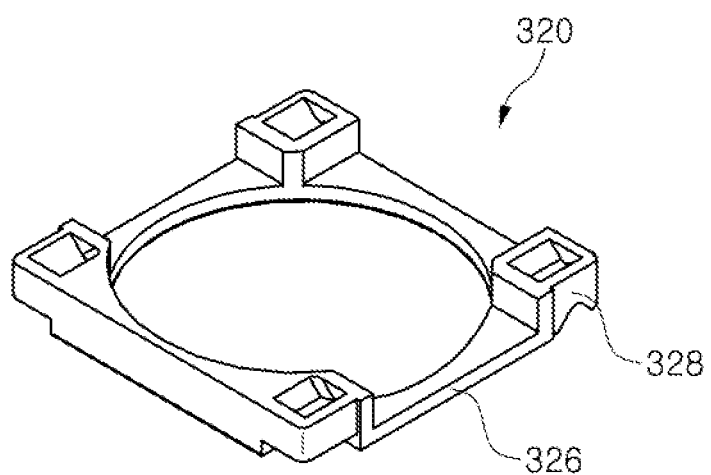
FIG. 11 is a perspective view of a second frame illustrated in FIG. 2.

Meanwhile, the shape of a side surface of the second frame 320 will be described with reference to FIG. 11.

Recesses 328 may be formed in the side surfaces of the second frame 320. For example, the recesses 328 may be recessed inwardly of the side surfaces 326 of the second frame 320. The shape of the second frame 320 as described above may prevent the outer side surfaces of the second frame 320 and the inner side surfaces of the first frame 310 from being adhered to each other by a lubricant.

The third frame 330 may be mounted in the second frame 320. For example, the third frame 330 may be mounted on a top surface of the second frame 320. The third frame 330 may move relative to the second frame 320 in the second direction perpendicular with respect to the optical axis. For example, the third frame 330 may move in the second direction (the X axis direction based on FIG. 1) perpendicular with respect to the optical axis along the third guide grooves 322 of the second frame 320. The plurality of second permanent magnets 224 may be mounted on the third frame 330. For example, the three second permanent magnets 224 may be mounted on the second to fourth side surfaces of the third frame 330, respectively.

Mounting parts 332 for the second permanent magnets 224 may be formed in the third frame 330. For example, the mounting parts 332 may be formed in three or more side surfaces of the third frame 330, respectively. The mounting parts 332 may be roughly processed by etching or other methods so as to have a predetermined degree of roughness. The mounting parts 332 may induce an effect of increasing an area to which the adhesive may be applied between the mounting parts 332 and the second permanent magnets 224. The third frame 330 may accommodate the buffer member 500 therein. For example, an accommodation space 334 in which the buffer member 500 is accommodated may be formed in the third frame 330. The accommodation space 334 may be formed in a position facing the buffer member 500. For example, the accommodation space 334 may be formed in four corner portions of the third frame 330.

The lens unit 300 may include the lens barrel 340. For example, the lens unit 300 may include a lens barrel 340 including one or more lenses. The lens barrel 340 may be mounted in the third frame 330. For example, the lens barrel 340 may be inserted into the third frame 330 to thereby move integrally with the third frame 330. The lens barrel 340 may move in the optical axis direction and the directions perpendicular with respect to the optical axis. For example, the lens barrel 340 may move in the optical axis direction by the first actuator 210 and move in the directions perpendicular with respect to the optical axis by the second actuator 220.

The lens unit 300 may further include a cover member 350 and the magnetic bodies 370.

The cover member 350 may prevent the second frame 320 and the third frame 330 from being separated from the internal space of the first frame 310. For example, the cover member 350 may be coupled to the first frame 310 to block the second frame 320 and the third frame 330 from being upwardly separated from the first frame 310.

The cover member 350 may include a plurality of latches 352. For example, the cover member 350 may include four latches 352 extended in one direction (a downward direction based on FIG. 1). The latches 352 formed as described above may be engaged with protrusions 319 of the first frame 310 to provide firm coupling force between the cover member 350 and the first frame 310.

The magnetic bodies 370 may be mounted in the first frame 310. For example, the magnetic bodies 370 may be mounted in one or more of the second to fourth side surfaces of the first frame 310 to generate attractive force with the second coil 222 and the second permanent magnet 224 of the second actuator 220. The magnetic bodies 370 may fix the positions of the second and third frames 320 and 330 with respect to the first frame 310 in an inactivated state of the actuator unit 200. For example, the lens unit 300 may be maintained in a predetermined position inside the housing 110 by attractive force between the magnetic body 370 and the second coil 222.

A ball member 400 may allow the lens unit 300 to move smoothly. For example, the ball member 400 may allow the lens unit 300 to move smoothly in the optical axis direction and the directions perpendicular with respect to the optical axis. The ball member 400 may be classified as a first ball member 410, a second ball member 420, and a third ball member 430. As an example, the first ball member 410 may be disposed in the first guide groove 312 of the first frame 310 to allow the first frame 310 to move smoothly in the optical axis direction. As another example, the second ball member 420 may be disposed in the second guide groove 314 of the first frame 310 to allow the second frame 320 to move smoothly in the first direction perpendicular with respect to the optical axis. As another example, the third ball member 430 may be disposed in the second guide groove 322 of the second frame 320 to allow the third frame 330 to move smoothly in the second direction perpendicular with respect to the optical axis. For reference, although not illustrated, a lubricating material for decreasing friction and noise may be provided in all locations in which the ball members 410, 420 and 430 are disposed. For example, a viscous fluid may be injected into each of the guide grooves 312, 314, and 322. As the viscous fluid, grease having excellent viscosity and lubricating properties may be used.

The buffer member 500 may decrease noise caused by the movement of the lens unit 300. For example, the buffer member 500 may decrease impact sounds caused by the movement of the lens unit 300 in the optical axis direction and the directions perpendicular with respect to the optical axis by external impacts. For example, the buffer member 500 may be formed on the cover member 350 to decrease impact sounds between the lens unit 300 and the housing unit 100.

The buffer member 500 may be formed of a material having a substantially high Poisson's ratio. For example, the buffer member 500 may be formed of a material having a Possion's ratio of 0.4 or more. For example, the buffer member 500 may be formed of a rubber material. As another example, the buffer member 500 may be formed of a liquid material that may be gelated at room temperature. That is, the buffer member 500 may be formed of a material in a gel state, or the like.

Figure 2:
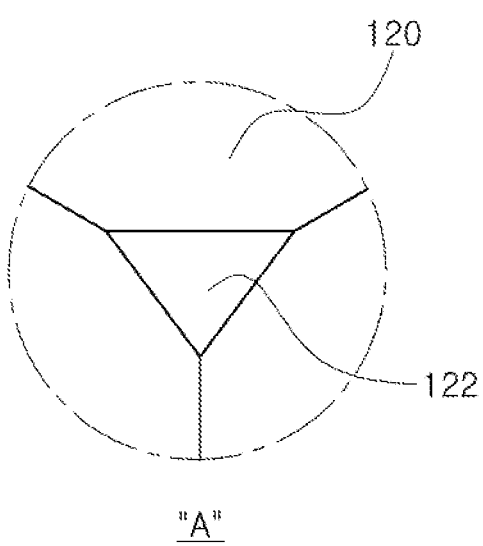
FIG. 2 is an enlarged view of part A illustrated in FIG. 1.

The shape of the corner of the shield can 120 will be described with reference to FIG. 2.

The corner 122 of the shield can 120 may be substantially processed to be flattened as described above. For example, the corner 122 of the shield can 120 may be processed to be an inverted triangular flat surface when the corner 122 is viewed with the naked eye. For example, the shield can 120 may be manufactured by a deep drawing method.

The shield can 120 having the aforementioned shape may facilitate coupling to the housing. In addition, since the camera module 10 has the shield can 120 of which the corners thereof are flat, the camera module 10 may be easily mounted in an electronic device body and increase the degree of freedom in disposition in the electronic device body. Further, since the shield can 120 and the housing 110 in the camera module 10 may be easily assembled, a design capable of easily securing an AF/OIS driving distance may be created.

Figure 3A:
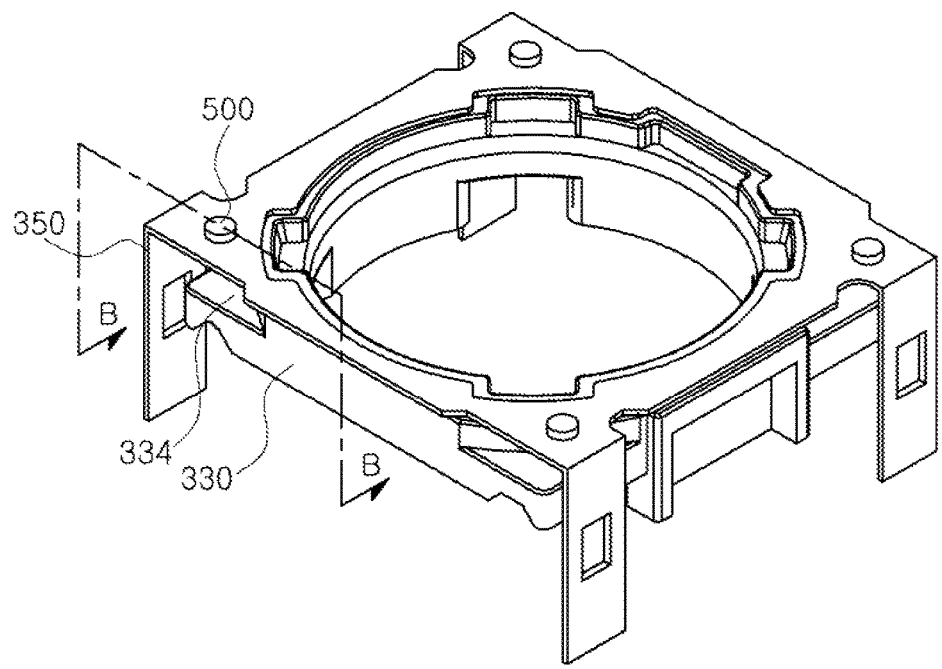
FIG. 3A is an assembled perspective view of a cover member and a third frame illustrated in FIG. 1.

The coupling of the third frame 330 and the cover member 350 will be described with reference to FIG. 3A. The cover member 350 may be disposed on an upper portion of the third frame 330. For example, the cover member 350 may cover the upper portion of the third frame 330.

Figure 3B:
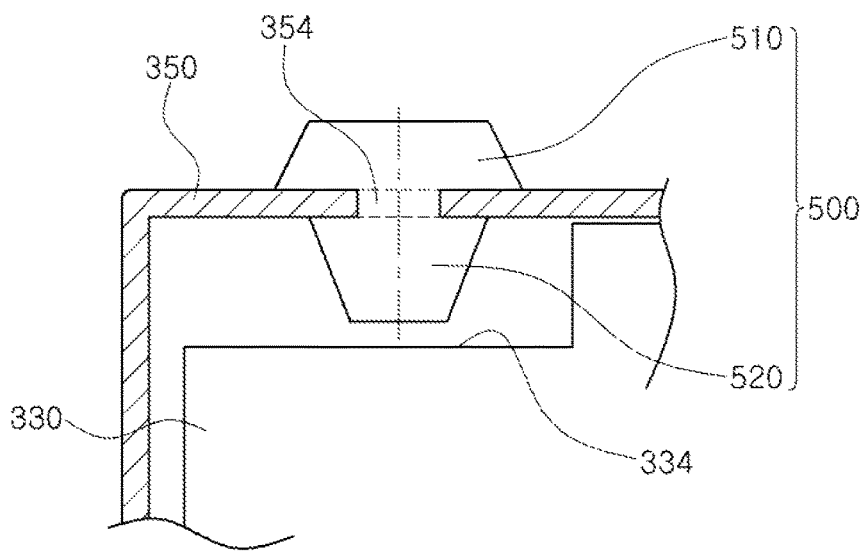
FIG. 3B is a cross-sectional view of the cover member and the third frame taken along line B-B' of FIG. 3A.

A cross-sectional structure of the cover member 350 will be described with reference to FIG. 3B.

The cover member 350 may include the buffer member 500. The buffer member 500 may be formed to protrude from both surfaces of the cover member 350. For example, a first portion 510 of the buffer member 500 may protrude in an upward direction of the cover member 350, and a second portion 520 thereof may protrude in a downward direction of the cover member 350. The first and second portions 510 and 520 of the buffer member 500 may be formed to be larger than a hole 354 of the cover member 350. The buffer member 500 may be formed integrally with the cover member 350 by insert injection molding. The buffer member 500 formed by insert injection molding may have a uniform size and have firm coupling force as compared to a bonding coupling method.

The third frame 330 may accommodate the buffer member 500 therein. For example, the accommodation space 334 accommodating the second portion 520 of the buffer member 500 therein may be formed in the third frame 330. Therefore, even when the third frame 330 and the cover member 350 are coupled to each other, there is no interval between the third frame 330 and the cover member 350 due to the buffer member 500.

Figure 4:
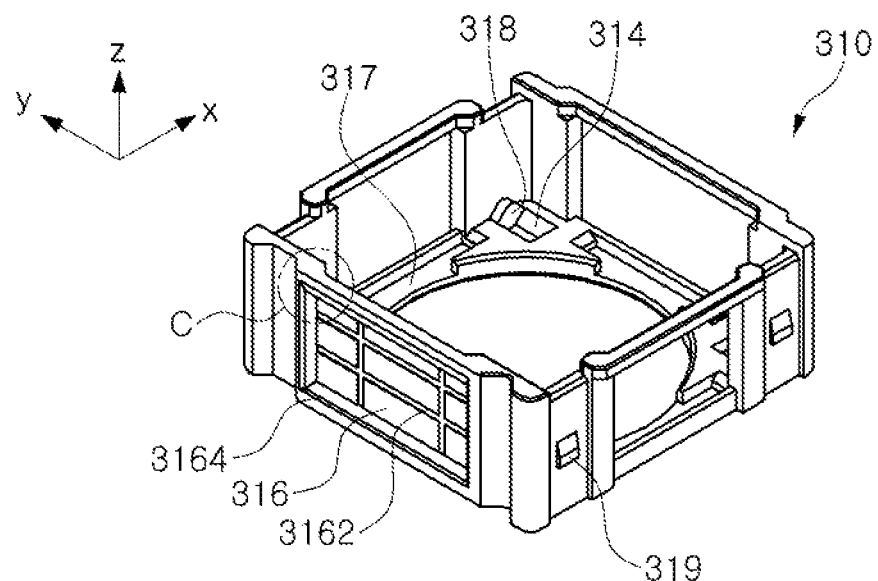
FIG. 4 is an enlarged perspective view of a first frame illustrated in FIG. 1.

Next, the first frame 310 will be described with reference to FIG. 4.

The first frame 310 may have a structure appropriate for preventing an overflow of a lubricant injected into the second guide groove 314. For example, a protrusion section 318 may be formed on one side of the second guide groove 314. The protrusion section 318 may prevent the ball member and an inner side wall of the first frame 310 from directly coming in contact with each other and prevent the overflow of the lubricant. In addition, this configuration may prevent the first frame 310 and the second frame 320 from being adhered to each other via the lubricant. The protrusion section 318 may be formed of a separate independent member to thereby be disposed at the bottom of the first frame 310 or may be formed integrally with the first frame 310 at the time of forming the first frame 310.

A mounting part 316 for the first permanent magnets 214 may be formed in the first frame 310. The mounting part 316 may be etched to allow the adhesive to be suitably applied thereto. In addition, a groove 3162 for uniform distribution of the adhesive may be formed in the mounting part 316. Further, an inclined surface 3164 for providing an adhesion space may be formed at an edge of the mounting part 316.

Figure 5:
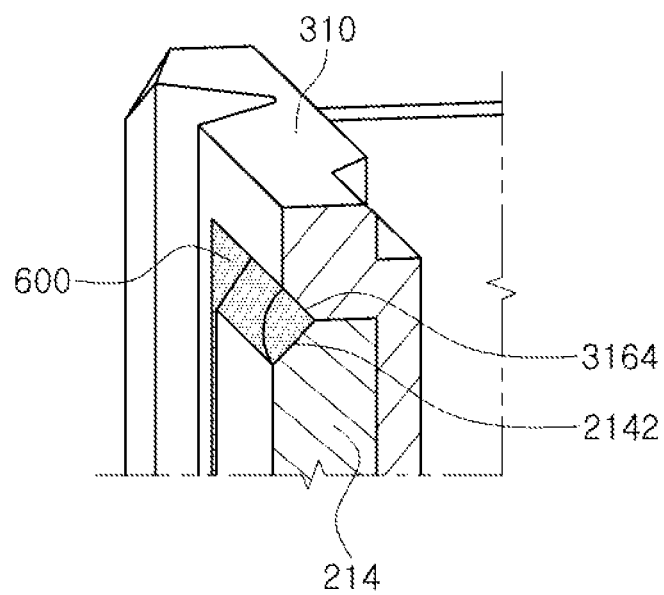
FIG. 5 is an enlarged view of part C illustrated in FIG. 4.

The mounting part 316 of the first frame 310 will be described with reference to FIG. 5.

Figure 6:
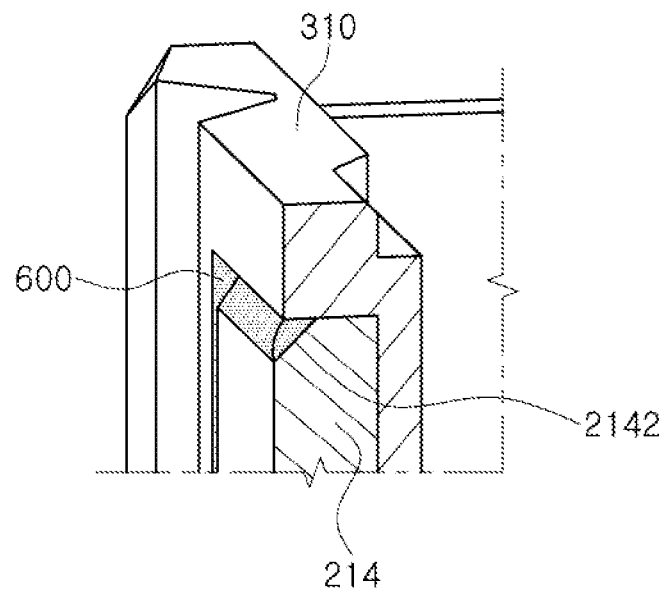
FIG. 6 is an enlarged view illustrating another shape of part C illustrated in FIG. 4.

The inclined surfaces 3164 may be formed at the edges of the mounting part 316. In addition, the same or similar inclined surfaces 2142 may be formed at edges of the first permanent magnet 214. These inclined surfaces may provide a space which is to be filled with the adhesive 600. Therefore, according to the present exemplary embodiment, coupling force between the first frame 310 and the first permanent magnet 214 may be improved. Meanwhile, the inclined surfaces 3164 of the mounting part 316 may be omitted as illustrated in FIG. 6.

Such inclined surfaces may allow the first frame 310 and the first permanent magnet 214 to be firmly coupled to each other, and a separate element for preventing separation of the first permanent magnet 214 may be omitted.

Figure 7:
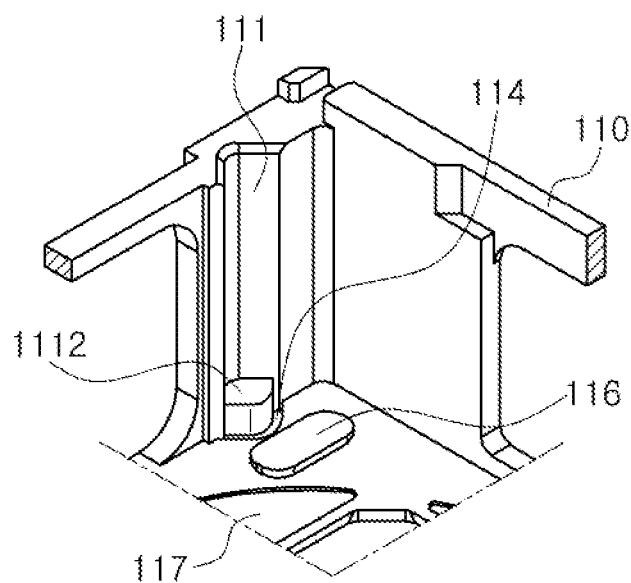
FIG. 7 is a partially enlarged perspective view of a housing illustrated in FIG. 1.
Figure 8A:
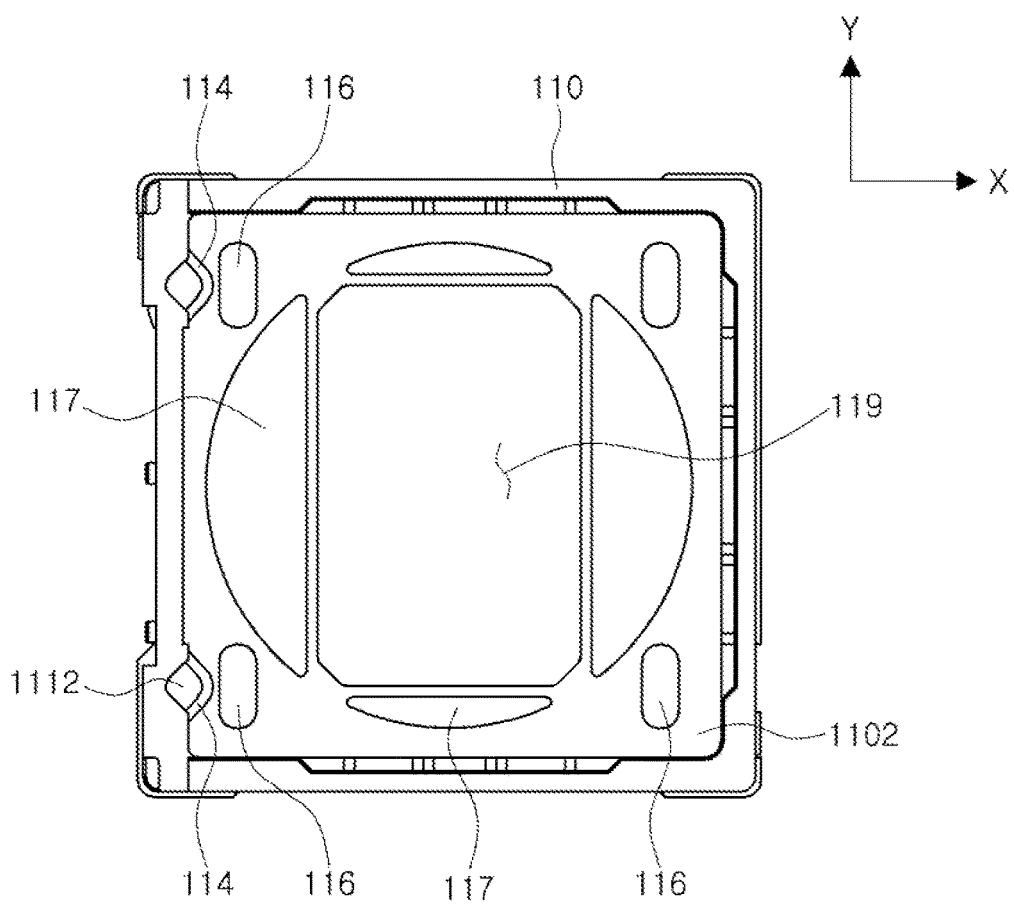
FIG. 8A is a plan view of the housing illustrated in FIG. 1.

The housing 110 will be described with reference to FIGS. 7 and 8A.

The housing 110 may accommodate the first ball member 410 therein. For example, a guide groove 111 capable of accommodating a plurality of first ball members 410 therein may be formed in an inner surface of the housing 110. The guide groove 111 may be formed to face the first guide groove 312 of the first frame 310. The guide groove 111 may be extended in the optical axis direction. For example, the guide groove 111 may be formed in the height direction of the housing 110. A protrusion 1112 may be formed in the guide groove 111 so as to maintain the first ball member 410 at a predetermined height.

The housing 110 may have a structure for preventing the overflow of the lubricant. For example, a groove 114 for preventing the lubricant from overflowing toward a bottom 1102 of the housing 110 may be formed at a circumference of the protrusion 1112 coming into contact with the first ball member 410.

The housing 110 may include an element for maintaining the first frame 310 at a predetermined height. For example, a protrusion 116 may be formed on the bottom 1102 of the housing 110 so as to allow the first frame 310 to protrude in the optical axis direction. The protrusion 116 may block the bottom of the first frame 310 and the bottom 1102 of the housing 110 from being closely adhered to each other. For example, the protrusion 116 may prevent the housing 110 and the first frame 310 from being adhered to each other by the lubricant present on the bottom of the housing 110. The protrusion 116 may limit the movement displacement of the first frame 310. For example, the protrusion 116 may limit a minimum distance between the first frame 310 and the image sensor. Therefore, the camera module 10 according to the present exemplary embodiment may uniformly maintain a back focus length through the protrusion 116.

The housing 110 may include an element for collecting foreign materials. For example, a foreign material accommodation space 117 may be formed in the bottom of the housing 110 so as to accommodate dust infiltrating between the housing unit 100 and the lens unit 300, and the like. The foreign material accommodation space 117 may be formed at a circumference of a rectangular window 119.

Figure 8B:
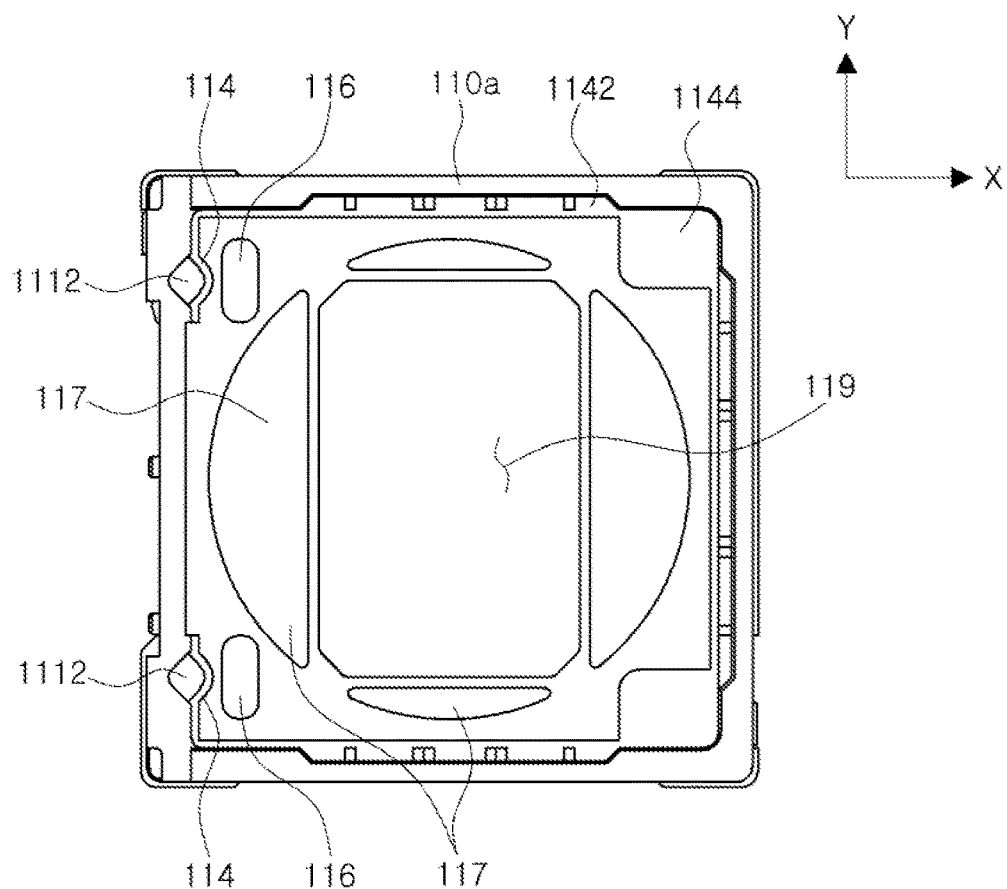
FIGS. 8B and 8C are plan views of housings according to other exemplary embodiments.

Next, a housing 110a according to another exemplary embodiment will be described with reference to FIG. 8B.

The housing 110a according to the present exemplary embodiment may be distinguished from the housing 100 according to the previous exemplary embodiment with respect to the shape of a groove accommodating a lubricant therein. For example, the groove 114, a channel 1142, and a lubricant storage space 1144 may be formed in the bottom of the housing 110a.

The groove 114 may be formed at the circumference of the protrusion 1112. The groove 114 may accommodate the lubricant flowing along the surface of the protrusion 1112 therein.

The channel 1142 may connect the groove 114 and the lubricant storage space 1144 to each other. For example, the channel 1142 may be formed to be elongated at inner edges of the housing 110a to connect the groove 114 formed at one side of the housing 110a and the lubricant storage space 1144 formed at the other side of the housing 110a to each other. The channel 1142 may allow the lubricant provided in the groove 114 to move toward the lubricant storage space 1144.

The lubricant storage space 1144 may accommodate a significant amount of the lubricant introduced through the groove 114 therein. For example, the lubricant introduced into the groove 114 may be accommodated in the lubricant storage space 1144 through the channel 1142.

Since the housing 110a having the aforementioned structure may accommodate a large amount of lubricant therein, the bottom of the housing 110a may not be contaminated by the lubricant.

Figure 8C:
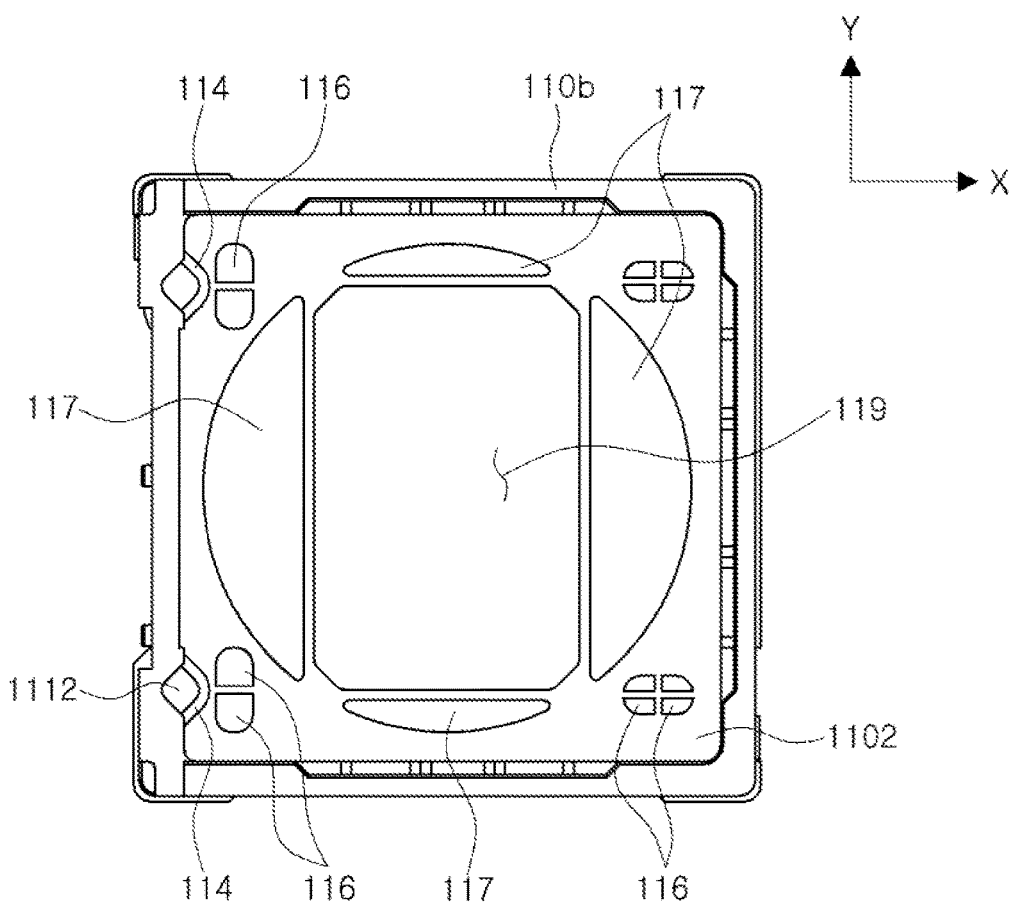

Next, a housing 110b according to another exemplary embodiment will be described with reference to FIG. 8C.

The housing 110b according to another exemplary embodiment may be distinguished from the housing according to the above-mentioned exemplary embodiment with respect to the shape of a protrusion 116. For example, the protrusion 116 may be divided into a plurality of portions.

Since the protrusion 116 having the aforementioned shape has a small contact area with the lens unit 300, noise generated at the time of impacts between the protrusion 116 and the lens unit 300 may be reduced.

Figure 9:
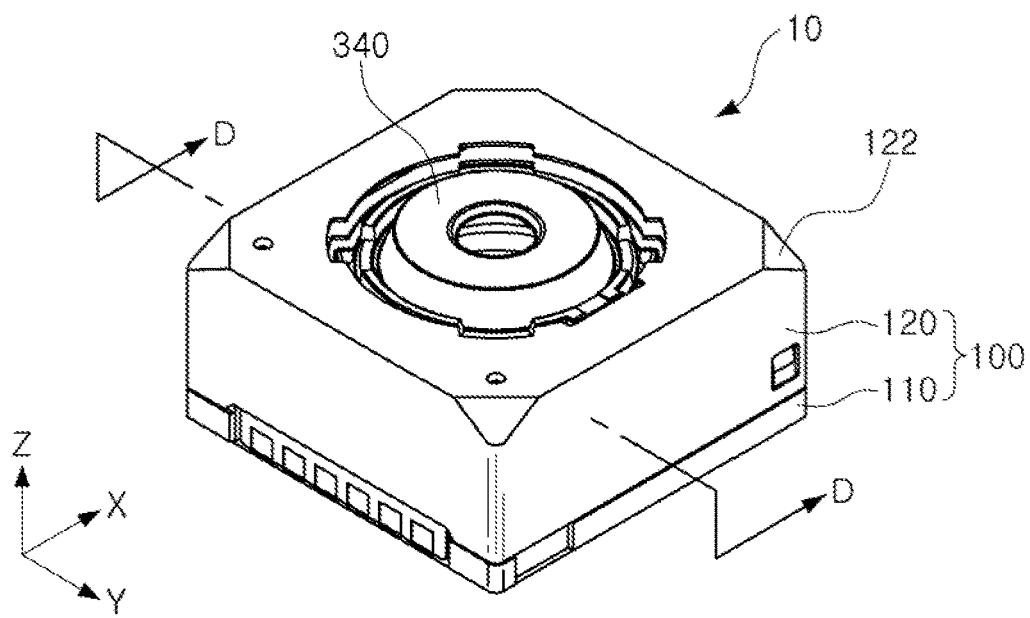
FIG. 9 is an assembled perspective view of the camera module illustrated in FIG. 1.
Figure 10:
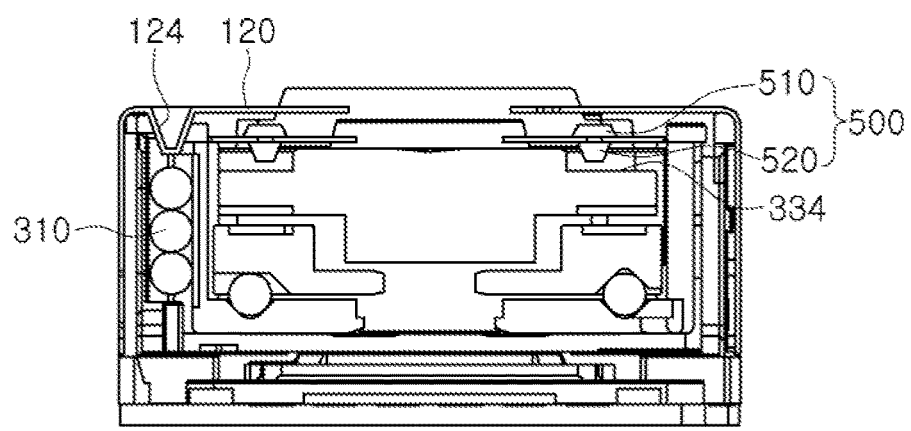
FIG. 10 is a cross-sectional view of the camera module taken along line D-D of FIG. 9.

Then, a cross-sectional structure of the shield can 120 will be described with reference to FIGS. 9 and 10.

The shield can 120 may include a protrusion 124 for preventing separation of the first ball member 410. For example, a plurality of protrusions 124 protruding downwardly may be formed on one surface of the shield can 120. The protrusion 124 may be extended toward the first guide groove 312 of the first frame 310 to block the first ball member 410 from being separated toward the outside of the first frame 310. The protrusion 124 of the shield can 120 may be formed by an embossing process.

As set forth above, according to exemplary embodiments of the present disclosure, an operational reliability of the camera module may be improved.

While exemplary embodiments have been shown and described above, it will be apparent to those skilled in the art that modifications and variations could be made without departing from the scope of the present invention as defined by the appended claims.

What is claimed is:

1. A camera module comprising: a lens unit;
   an actuator unit configured to move the lens unit; and
   a housing unit configured to accommodate the lens unit therein,
   wherein corners of the housing unit are provided with flat surfaces which are inclined with respect to an optical axis of the lens unit, and
   wherein the lens unit further comprises
   a first frame configured to move relative to the housing unit in an optical axis direction,
   a second frame configured to move relative to the first frame in a first direction perpendicular with respect to the optical axis, and
   a third frame configured to move relative to the second frame in a second direction perpendicular with respect to the optical axis, and wherein the first frame, the second frame, and the third frame are configured to substantially move directly along guide grooves.

2. The camera module of claim 1, wherein the flat surfaces of the corners have an inverted triangular shape.

3. The camera module of claim 1, wherein corners of the first frame are provided with flat surfaces which are inclined with respect to the optical axis of the lens unit.

4. The camera module of claim 1, further comprising ball members disposed between the first and second frames and between the second and third frames.

5. The camera module of claim 1, wherein the second frame comprises first guide grooves disposed on a top surface and recesses disposed directly below the first guide grooves on a bottom surface.

\* \* \* \* \*